United States Patent [19]

Greenberger

[11] 4,004,459
[45] Jan. 25, 1977

[54] COMBINATION STRIP CONTACTING DEVICE FOR USE IN A ROLLING MILL

[75] Inventor: Joseph Irwin Greenberger, Pittsburgh, Pa.

[73] Assignee: Wean United, Inc., Pittsburgh, Pa.

[22] Filed: Apr. 14, 1976

[21] Appl. No.: 676,942

[52] U.S. Cl. .............................................. 73/144
[51] Int. Cl.² ........................................ G01L 5/10
[58] Field of Search ............ 73/144, 104, 159; 226/4

[56] References Cited
UNITED STATES PATENTS

| | | | |
|---|---|---|---|
| 3,499,306 | 3/1970 | Pearson | 73/159 X |
| 3,557,614 | 1/1971 | Muhlberg | 73/144 |
| 3,788,534 | 1/1974 | Shumaker | 226/4 |

*Primary Examiner*—Jerry W. Myracle
*Attorney, Agent, or Firm*—Daniel Patch

[57] ABSTRACT

A strip contacting device used between stands of a rolling mill for simultaneously performing combined modes of operation, such as a shapemeter/looper or a shapemeter/tensiometer. It consists of a frame with a pivotal arm connected to a piston cylinder assembly, whereby a desired mode can be carried out by using a shapemeter roller and allowing the arm to either float or assume a fixed position relative to the passline of the mill.

6 Claims, 5 Drawing Figures

COMBINATION STRIP CONTACTING DEVICE FOR USE IN A ROLLING MILL

Presently, loopers, tensiometers, and shapemeters, usually taking the form of an arm with a roller which contacts the strip as the strip travels from one stand to the other, are employed between adjacent mill stands of a tandem rolling mill. A looper, which may be a constant strip tension exerting device may be employed in a tandem mill arrangement to maintain the strip taut as the preceding stand delivers the product at a faster rate than that at which the succeeding stand is removing the strip.

Tensiometers are employed for measuring the strip tension. They are used to either indicate or to regulate tension between stands of tandem strip mills. In the case of regulating the tension, accurate controlled tension is mandatory since excessive tension tends to break the strip and insufficient tension may cause undesirable strip looping between the stands. Variation in strip tension also causes strip gauge variation.

Since it is desirable to produce, in a cold mill, a "good shaped" strip, i.e. a flat strip, shapemeters are used to measure the contour of a strip by suitable sensors which transform these contour differences into electrical signals. These signals enable the operator or the automatic controls to make necessary adjustments to the roll bending means, the screw down means, and/or the speed control means of the stands to compensate for the particular objectionable shape occurring in the strip. For instance, if the edges of the strip are wavy, an adjustment may be made to the roll bending means to apply a force in a direction to correct for this non-flatness in the strip.

Even though the above delineated strip contacting devices were originally constructed to be limited to one particular mode of operation, in the past ten years or so, apparatuses have evolved which combine more than one mode of operation. Stone U.S. Pat. No. 3,169,420 of Feb. 16, 1965, uses the same strip contacting device for one of three separate functions at three different times: (1) as a looper; (2) as a tensiometer; and (3) as a variable tension exerting means for gauge control. In Shumaker U.S. Pat. No. 3,788,534 of Jan. 29, 1974, a strip engaging device permits both a looper function and a tensiometer function by utilizing a looper roller and a tension measuring roller which are mounted on separate arms of the same frame.

As can be seen from the above, it is desirable to have installed between the stands a strip contacting device for performing one of the identified functions. But due to the serious and continuous problem of not knowing strip shape and strip tension distribution between stands when cold rolling some materials, such as silicon steel, performing at least two of the identified functions is becoming more desirable. Silicon steel is brittle and notch sensitive, and if subjected to uneven and improper tension patterns, strip breakage or cobbles result. Therefore, rolling of this material requires both a shapemeter and a looper having a long-stroke to follow the strip. When carbon steels are rolled by the same mill, a shapemeter and a tensiometer are desireable. And in the future, with the development of different steels will come a great need to utilize more than one strip contacting device for performing several functions between stands. These additional devices result in overcrowded floor areas or the use of space which usually is not easily afforded and separate control systems for each unit.

It is, therefore, an object of this invention to provide a strip contacting device capable of effecting various modes or sets of functions in an easy, economical, and highly efficient manner.

Another object of the present invention is to provide a strip contacting device in combination with other means that allows several sets of functions to be performed by the utilization of only one device. It is a further object of the present invention to provide such a device which will perform at least two of these functions simultaneously by using only one roller assembly.

Still, a further object of this invention is to provide a means to enable a shapemeter roller to be used in combination with means to either fix or float the roller relative to the mill pass line for carrying out a set of functions simultaneously, such as a shapemeter-looper function or a shapemeter-tensiometer function.

And yet a still further object of the present invention is to provide a strip contacting device associated with a control system which enables a set of functions to be performed after the proper positioning or movement of a shapemeter roller has been selected, by selecting a desired control mode.

These objects, as well as other novel features and advantages of the present invention will be better understood when the following description is read along with the accompanying drawings of which:

Figure 1:
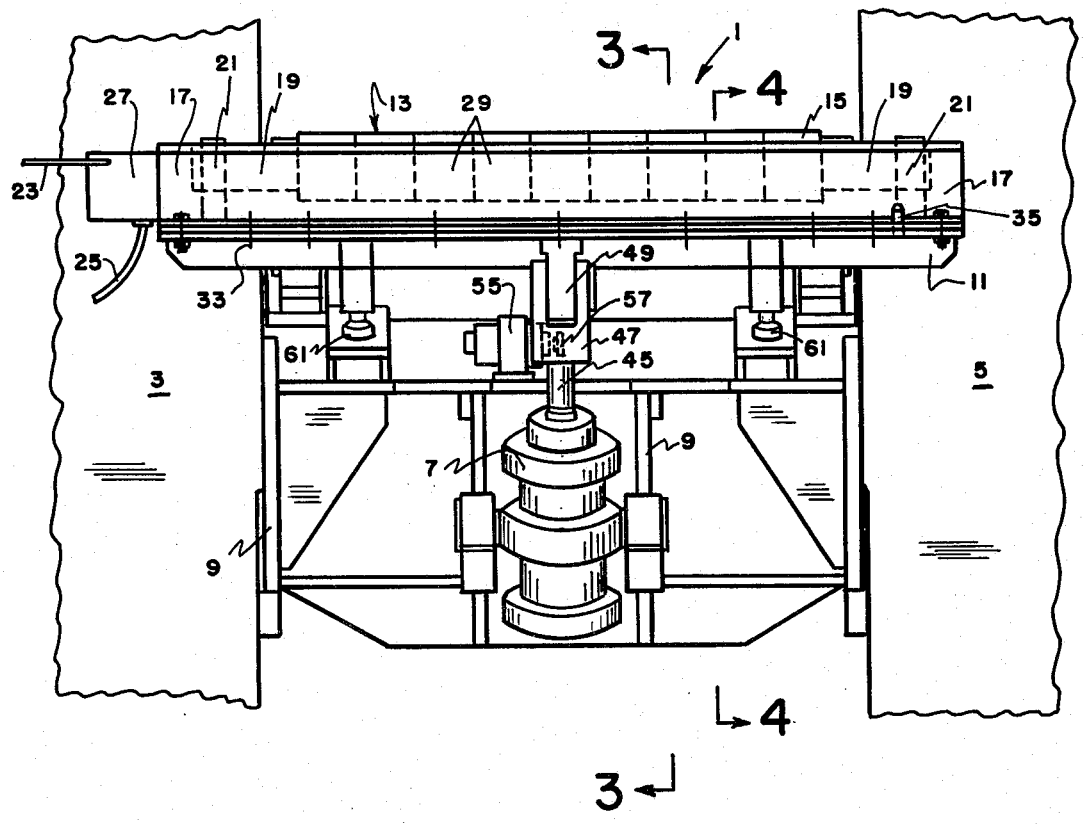
FIG. 1 is an elevational view of a preferred embodiment of the present invention located between two housing posts of a stand of a rolling mill.

Referring first to FIG. 1, there is illustrated a strip contacting device 1 situated between two housing posts 3–5 of a stand, which housing posts support two back-up rolls and two work rolls (not shown) for reducing steel strip. The construction and operation of the mill stand follows well-known practice, as does the strip contacting device per se. For purposes of illustration, assume the device has been incorporated in a tandem cold rolling mill.

In this FIG. 1, several of the more important elements of the invention, such as a piston cylinder assembly 7, frame 9, arm 11, and shapemeter roller assembly 13 are illustrated. Roller assembly 13 may comprise one of several available shapemeter devices, which in the form shown comprises a roller 15 almost entirely enclosed by a casing 17, except at the upper portion, and rotatably mounted by a shaft 19 in the casing by bearings 21. A more detailed explanation of the intended illustrated type of shapemeter and operation is set out in Pearson U.S. Pat. No. 3,499,306 of Mar. 10, 1970. To the left of the assembly 13 in FIG. 1, is an electrical conduit 23, an air supply line 25, and a summing control box 27. As shown, the shapemeter roller 15 has several segmented sensor bearings 29, which relay differential pneumatic signals to be converted in the control box into differential electrical signals representing the contour of the strip as the under surface of the strip contacts roller 15.

Nuts and bolts 33 enable roller assembly 13 to be secured to or removed from arm 11 as a unit. Locating pin 35, mounted on the arm, properly locates roller casing 17, thereby properly aligning the bolt holes.

Figure 2:
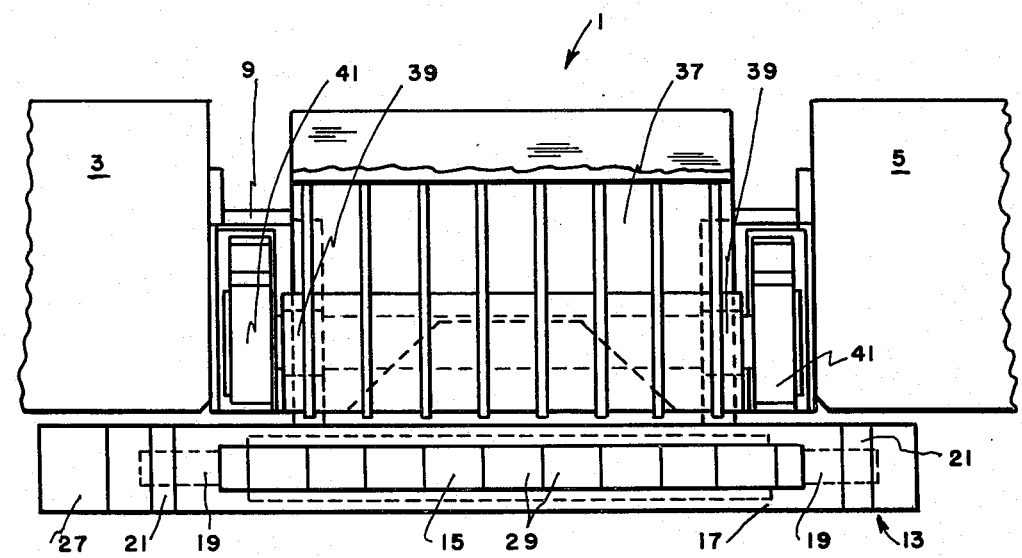
FIG. 2 is a plan view of the roller and apron shown in FIG. 1.

FIG. 2 illustrates the positioning of the roller assembly 13 relative to apron 37 of arm 11, which apron 37 receives the leading end of the strip as it passes between the stands during the threading operation. Shaft 39, shown in FIG. 2, but better shown in FIGS. 3 and 4, pivotally mounts arm 11 in bearings 41 secured to frame 9.

Figure 3:
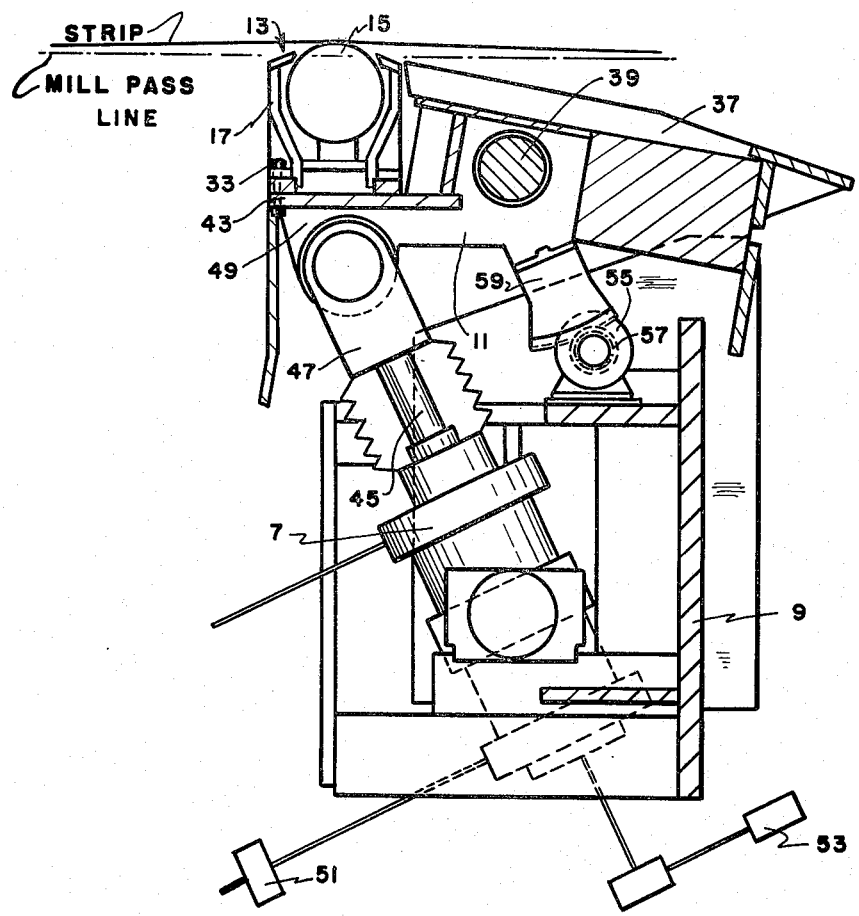
FIG. 3 is a sectional view of the strip contacting device taken along lines 3—3 of FIG. 1.
Figure 4:
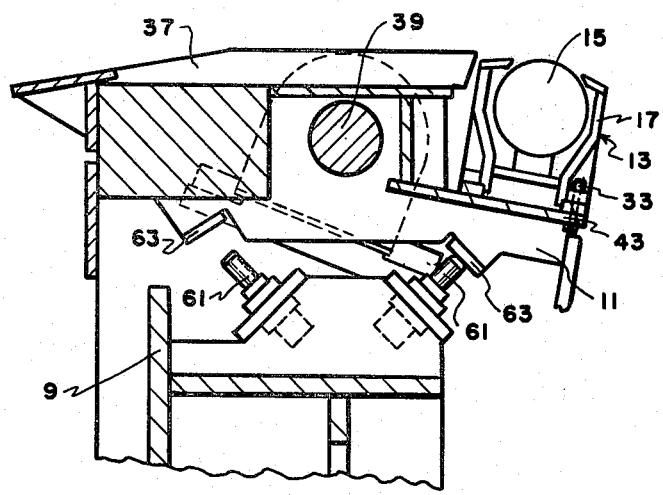
FIG. 4 is a partial, sectional view of the device taken along lines 4—4 of FIG. 1.

Referring now to FIG. 3, one is able to better appreciate how roller assembly 13 is secured to a shelf 43 of arm 11 and how roller 15, when raised, deflects the strip above the pass line of the mill, the strip and pass line being indicated in FIG. 3. Arm 11, with roller assembly 13, is raised by piston cylinder assembly 7 who piston rod 45 has a clevis 47 for pivotally connecting to bracket portion 49 of arm 11. Associated with cylinder assembly 7 is a pressure transducer 51 and a variable pump 53 whose detailed interrelationships and operation appear in U.S. Pat. No. 3,169,420, and more about which will be said later in explaining the operation of the invention. The piston cylinder assembly 7 is trunnion mounted in frame 9 (seen best in FIG. 1). It will be appreciated that cylinder assembly 7, arm 11, shaft 39, and clevis 47 for a self-compensating linkage system according to the description set forth in the aforesaid U.S. Pat. No. 3,169,420. By virtue of this, a constant tension can be maintained on the strip for a wide range of movement of the roller while maintaining constant cylinder pressure.

Still referring to FIG. 3, a selsyn 55 for indicating the arcuate positioning of arm 11 when raised and lowered by piston cylinder assembly 7 is supported on top of frame 9. Rotatably mounted at one end of selsyn 55 is gear 57, which meshes with the teeth of a segmental section 59 of arm 11 as the arm makes its arcuate path. As one views FIG. 4, it is apparent that an extreme positioning of roller 15 is achieved by adjustable stops 61 contacting wearplates 63 of arm 11. Each adjustable stop 61 is mounted in frame 9.

Figure 5:
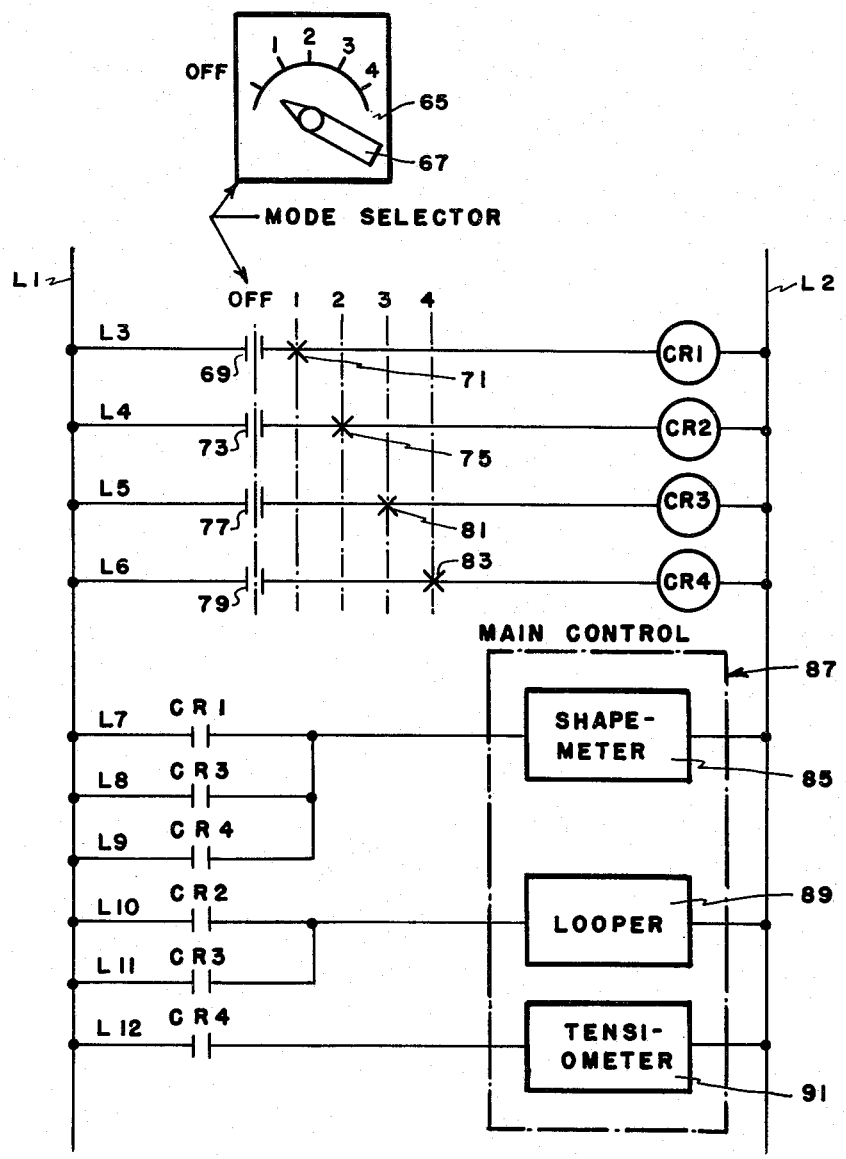
FIG. 5 is a schematic diagram of an electrical control system for selecting various modes of operation or sets of functions.

Turning now to the electrical control in FIG. 5, there is shown a mode selector 65, having a dial 67 for selecting one of the five indicated positions associated with the illustrated electrical circuit. The electrical circuit comprises power lines $L_1$ and $L_2$. The first line $L_3$ located between lines $L_1$ and $L_2$, has a switch 69, a contact 71, and a control relay CR1. Similarly, line $L_4$ has switch 73, contact 75, and control relay CR2, as does lines $L_5$ and $L_6$, where the switches are identified as 77 and 70, the contacts as 81 and 83, and the control relays as CR3 and CR4, respectively. As shown, control relay CR1 is electrically connected to line $L_7$, which is connected to a shapemeter control 85 of the main control 87; as is control relay CR2, having an electrical connection identified as line $L_{10}$, connected to a looper control 89. Control relay CR3 is electrically connected to two lines $L_8$ and $L_{11}$, which are respectively connected to shapemeter control 85 and looper control 89. And finally, control relay CR4 also has two electrical connections to lines $L_9$ and $L_{12}$, connected to shapemeter control 85 and tensiometer control 91, respectively.

With the foregoing in mind, a brief explanation of the operation of the strip contacting device 1 will now be given. As mentioned above, it is one of the objects of the present invention to combine operations by using the same strip contacting device and selecting a desired mode of operation or set of functions. It is to be noted that single operations can also be achieved, which will be explained first. If a shapemeter mode is desired, the operator of the mill turns dial 67 to mode No. 1, which only energizes control relay CR1. Control relay CR1 energizes contact CR1 which energizes shapemeter control 85. This, in turn, actuates the differential pressure transducers (not shown) in roller assembly 13, and supplies air to the sensor bearings 29. In this particular operation, roller 15 of assembly 13 is to be held approximately one inch above the pass line by piston rod 45. Prior to this, the operator has set stops 61 to position roller assembly 13 in the required operating position and causes pump motor assembly 53 to deliver to the piston cylinder assembly 7 hydraulic fluid pressure sufficient to hold arm 11 against stops 61. The strip, under tension, is advanced over the segmented sensor bearings 29 of shapemeter roller assembly 13. The tension profile across the strip width results in a corresponding differential pressure profile across the segmented sensor bearings. The differential pressures, in turn, are converted into a corresponding electrical profile.

If a looper mode is desired, the operator turns dial 67 of the mode selector 65 to mode No. 2, which only energizes control relay CR2, which then energizes contact CR2. By this, looper control 89 is activated. The operator, prior to turning the dial 67 to mode No. 2, adjusts stops 61 to allow the relatively wide range of travel of the roller assembly 13. The motor pump unit 53 exerts, in this case, constant desired pressure on the cylinder assembly 7. The selected pressure will be chosen to give a desired strip tension. As described in U.S. Pat. No. 3,169,420, the linkage system compensates for the change of geometry for the strip so that for a constant cylinder pressure, a constant strip tension will be obtained even though the roller 15 travels over a relatively wide arc. During the pivotal movement of arm 11, the teeth of segmental section 59 rotates gear 57 to effect operation of selsyn 55, whereby, in accordance with well-known rolling mill control practice, the position of the roller assembly 13 is monitored.

A combined shapemeter-looper function is achieved quite easily by moving dial 67 of the selector 65 to mode No. 3, which brings into effect through the various electrical components both the shapemeter and looper controls 85 and 89, respectively. The operation of the cylinder assembly 7 and the adjustable stops 61 is the same as in mode No. 2. During this selected mode, roller assembly 13 allows an application of constant tension over a wide range of strip travel, and a concurrent and continuous determination of the strip shape characteristics; that is, the flatness characteristics of the strip. Because of the extended travel of the looper, there will be a varying resultant force profile on the segmented sensor bearings 29 depending upon the vertical location of the roller. This is so because the sensor bearings measure the vertical force components, which components vary with the angles between the strip and the sensor bearings. For this reason, in Mode 4 in order to sum the outputs of the sensor bearings to obtain a total tension value, the roller assembly 13 must be maintained in a fixed position. Consequently, the vertical force profile, while changing in magnitude will remain representative of the tension profile across the strip width.

Mode No. 4 represents a combined shapemeter-tensiometer function. When dial 67 is turned to this mode, the related electrical component controls 85 and 91 are energized. The operation of the cylinder assembly and positioning of the strip corresponds to mode No. 1. During this selected mode, the roller assembly 13 allows both an accurate measurement of total strip tension and a concurrent and continuous measurement of the shape of the strip. Total tension may be read either by totalizing the individual readouts of the affected segmented bearings of roller 15 by summing control box 27 or by pressure transducer 51 associated with the piston cylinder assembly.

From the above, it is obvious that it is possible to obtain a single tensiometer function. Just as obvious is the obtaining of other combination of modes or sets of functions then the ones described above. It should be noted that a solid deflector roller could be interchanged with the shapemeter roller in performing some of the sets of functions.

In accordance with the provisions of the patent statutes, I have explained the principle and operation of my invention and have illustrated and described what I consider to represent the best embodiment thereof.

I claim:

1. A device for contacting a strip issuing relative to a rolling mill for performing separate sets of functions on said strip, such as a combined shapemeter-looper function and a shapemeter-tensiometer function, comprising:
    a frame,
    an actuator supported by said frame,
    a roller means connected to said actuator for displacement thereby in a manner to contact substantially the entire width of said strip to assume a force transmitting relationship relative thereto,
    said roller including means sensitive to the shape of said strip and for producing a representation of said shape,
    means for causing said roller means to move through a relatively large working range which corresponds to said shapemeter-looper function and for positioning said roller in a substantially fixed location relative to a strip datum position which corresponds to said shapemeter-tensiometer function, and
    means for causing said roller means to perform selectively said separate sets of functions.

2. In a device according to claim 1, further comprising:
    a control means having a shapemeter-looper control means for activating said shapemeter-looper function and a shapemeter-tensiometer control means for activating said shapemeter-tensiometer function.

3. In a device according to claim 1, wherein said means for causing said roller means to move and for positioning said roller means comprises:
    means for causing said actuator to exert a desired force on said strip during said working range, and
    an adjustable stop means engageable with said roller means for positioning said roller means in said fixed location.

4. In a device according to claim 1, wherein said roller means comprises:
    an arm assembly pivotally connected to said frame, and wherein during said relatively large working range a substantial change takes place in the geometry of said strip relative to the pass line of said mill,
    said arm assembly characterized by a linkage system adapted to vary the force exerted by said actuator in a manner that for a constant actuator force a constant tension is obtained throughout said working range.

5. In a device according to claim 4, wherein said actuator comprises:
    a piston cylinder assembly, and
    means associated with said piston cylinder assembly for measuring the pressure of its fluid to determine the total tension exerted by said strip during said shapemeter-tensiometer function.

6. In a device according to claim 4, wherein said roller means further comprises:
    a number of means for measuring the transverse tension profile of said strip, and
    means for totalizing the results of said measuring means to produce a representation of the total tension between said strip and said roller means during said shapemeter-tensiometer function.

* * * * *